March 18, 1969   K. E. PETERSON   3,433,921
APPARATUS AND METHOD FOR INDICATING DEFECTIVE WELDS
Filed May 6, 1966   Sheet 1 of 4

INVENTOR
K. E. PETERSON
BY
JMPresson
ATTORNEY 3,433,921
APPARATUS AND METHOD FOR INDICATING DEFECTIVE WELDS
Karl E. Peterson, Mohnton, Pa., assignor to Western Electric Company, Incorporated, New York, N.Y., a corporation of New York
Filed May 6, 1966, Ser. No. 548,147
U.S. Cl. 219—110           16 Claims
Int. Cl. B23k 9/10

ABSTRACT OF THE DISCLOSURE

An indication of the probable failure of a percussive weld may be obtained by observing a time-varying current produced in forming the weld. If the welding current initially peaks outside of a predetermined range during the striking of a welding arc and/or falls continuously below a predetermined level within a predetermined time period immediately prior to extinguishment of the arc, the resulting weld is likely to fail. The described apparatus monitors the current during welding and indicates as unacceptable those welds which are likely to fail according to these criteria.

---

This invention relates generally to a method and apparatus for monitoring a welding operation and more particularly, to a method of and a system for obtaining an indication from a time-varying percussive welding current as to the probability of weld failure.

In recent years, methods and systems have been developed in the art of nondestructively monitoring percussive welding operations for the purpose of obtaining an indication of the probable subsequent performance of the welded assembly.

A large number of variables, both mechanical and electrical in nature, may enter into a percussive welding operation and deleteriously affect the quality of the weld. As a practical matter, it is impossible to compensate for the adverse effect that any one of these variables may have on the weld during the formation thereof. The most feasible approach to the problem of discriminating between welds which will probably fail subsequently and welds which will probably not fail, is believed to be one of monitoring the welding current during the welding cycle to determine whether or not certain prescribed criterion are met by the monitored welding current.

One of the most difficult problems confronting those working in this art is the determination of valid criteria for discriminating between welding currents which will probably result in weld failures and welding currents which will probably result in welds that are acceptable for the purpose desired. One criterion, for instance, that is generally regarded as being valid is based upon whether or not a welding arc, that is initially struck between two initially spaced-apart elements that are to be welded together, persists for a minimum interval of time as determined by the distance between the elements and the relative velocity of element movement toward each other. Another generally accepted criterion is based upon whether or not the peaks of current pulses that are generated by the striking and the subsequent extinguishment of the welding arc, fall within prescribed time and amplitude limits. The time limits are established as the time interval between the generation of the striking pulse and the generation of the extinguishing pulse, and the amplitude limits are established by blocking those striking and extinguishing pulses that peak below a predetermined level.

Extensive experimentation with monitoring systems that utilize these criteria established that while these criteria were valid and would result in the monitoring system detecting a substantial number of defective welds, they would not ensure a high degree of discrimination between satisfactory and unsatisfactory welds. To determine the possible existence of another criterion which might provide a more stringent discrimination between acceptable and unacceptable welds, percussive welding apparatus of a type which will be described subsequently, was employed to weld numerous essentially identical assemblies. Each assembly comprised a length of 20 mil Dumet wire and a cylindrical, 40 mil molybdenum stud. The welding current applied to weld the leads to the studs was monitored by a Model 564 Tektronix Memoscope and photographs were obtained from the Memoscope of the various welding current waveforms. After the leads and studs were welded together, the studs were clamped in a lead bending fixture. A one-pound weight was suspended from the free end of each wire and the number of times that the welded assembly withstood 90-degree bends of the wire before failing was recorded. Assemblies which failed after being subjected to ten or less complete bends were classified as being unacceptable welds, and those assemblies which did not fail after being subjected to more than ten complete bends were classified as acceptable.

It was observed from numerous photographs of the welding current waveforms that in some instances current transients appeared as abrupt departures from the ideal, smooth waveform. Whereas, some of these transients were of relatively short duration, others were of relatively long duration. More specifically, it was discovered that a weld failure might be expected if current transients of less than a certain amplitude occurred immediately prior to the extinguishment of the welding arc and additionally, if these transients failed to rise above this certain amplitude level before the elapse of a certain interval of time.

Since the arc voltage remains essentially constant during the interval immediately prior to arc extinguishment, it was surmised that the current transients appearing in the welding arc might be attributed to impedance transients caused by imperfections in the molten fillet.

A second criterion for weld acceptability, that was drawn from correlating the empirical data and the photographs, relates to the relationship between weld performance and the current peaks produced during the striking of the welding arc. More specifically, the existence of an empirically-determinable, acceptable amplitude range or band for the striking arc was discovered. Failures of the striking arcs to peak within this amplitude range could be correlated with subsequent unacceptable weld performance. Further experimentation established that these discoveries provided two criteria upon which the subsequent weld performance could be predicted with a high degree of reliability.

It is therefore an object of this invention to provide a new and improved method and apparatus for monitoring a percussive welding operation to obtain an indication of weld failure probability.

It is another object of this invention to provide a method and apparatus for obtaining a highly reliable indication of probable weld failure from a time-varying percussive welding current.

It is a further object of this invention to provide a method of and a system for monitoring transients that may be produced in a welding current prior to the extinguishment of the welding current arc.

Another object of this invention is to provide a method and system for obtaining an indication of possible weld failure from current values at the striking of the welding arc.

Still another object of this invention is to provide a method of and a system for monitoring a welding current to ascertain whether or not the current produced at the striking of the welding arc peaks within a prescribed range of amplitudes, and if impedance transients that may be produced by the weld prior to arc extinguishment, are likely to cause weld failure.

Further, it is an object of this invention to provide an electronic window for the observation of welding current transients that may appear in a percussive welding operation immediately prior to the extinguishment of the welding arc.

With these and other objects in view, the present invention contemplates new and improved methods and apparatus for obtaining an indication of weld failure probability from a monitored, time-varying percussive welding current waveform.

More specifically, a method and a system are provided for monitoring a welding current to ascertain the amplitudes and durations of current transients that may be developed immediately prior to arc extinguishment. In its preferred form, the instant system implements the method of this invention by providing an electronic window immediately prior to arc extinguishment through which the current or impedance transients may be observed electronically. If the system detects the continuous presence of a transient in the window for more than a prescribed time interval, it produces an output signal that may be utilized to provide an indication of weld failure. Additionally, the system is enabled by the formation of the monitoring window to compare the peak amplitude of the welding current to an empirically established amplitude range or band. The system produces another output signal representing a probable failure condition based upon the welding current peaking outside the established amplitude band.

A complete understanding of this invention may be had by reference to the following detailed description when read in conjunction with the accompanying drawings illustrating a preferred embodiment thereof, wherein.

Figure 1:
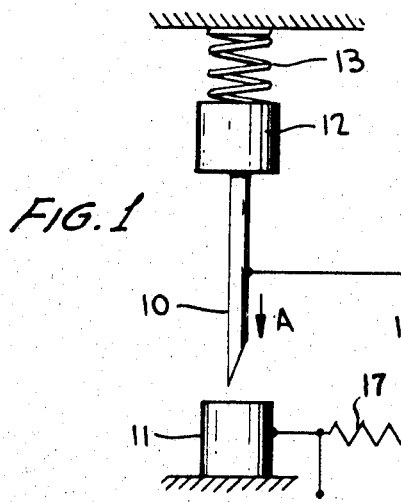
FIG. 1 is a schematic of a conventional percussive welding apparatus for welding leads to studs.

Referring now to FIG. 1, there is illustrated a conventional percussive welding apparatus, of a type referred to hereinabove, for welding a lead 10 to a stud 11. The upper end of the lead 10 is clamped in a chuck assembly 12 which may be driven downward, as indicated by the arrow A, by the release and expansion of a coil spring 13. The coil spring 13 should possess sufficient energy to drive the lead 10 toward the stud 11 at a velocity great enough to ensure a continuous current flow through the weld, but less than the initial rate of lead burnback. A suitable velocity may be on the order of fifteen inches per second.

A battery 14 of typically 45 volts, has its negative side connected through a resistor 15 of typically 100 ohms to charge a capacitor 16, of typically 5K microfarads. One plate of the normally charged capacitor 16 is connected to the lead 10. The stud 11 is connected through a resistor 17 to the positive plate of the capacitor 16. The resistor 17 has a relatively small value of resistance to establish a voltage of preferably 2 millivolts per ampere of welding current, and is incorporated in the welding apparatus to serve as a source of voltage waveforms having shapes which are essentially identical to the shapes of the welding current waveforms. The voltage waveforms that appear across the resistor 17 are monitored by the system of this invention.

Figure 2:
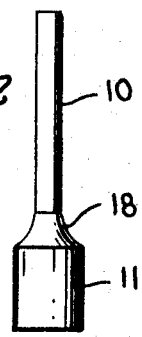
FIG. 2 illustrates a typical welded assembly of a lead and stud, the assembly being formed by the apparatus of FIG. 1.

At arc extinguishment, the lead 10 contacts the stud 11 and discharges the remaining energy stored in the capacitor 16, FIG. 1. The current waveform, FIG. 3, reflects this discharge of the capacitor 16 by rising sharply to a second peak. From this peak, the curve follows the decay of the capacitor to the zero current level. The molten fillet begins to cool and hardens as soon as the arc is extinguished. FIG. 2 illustrates the resulting welded assembly comprising the lead 10 and the stud 11 joined together by a weld fillet 18.

Figure 3:
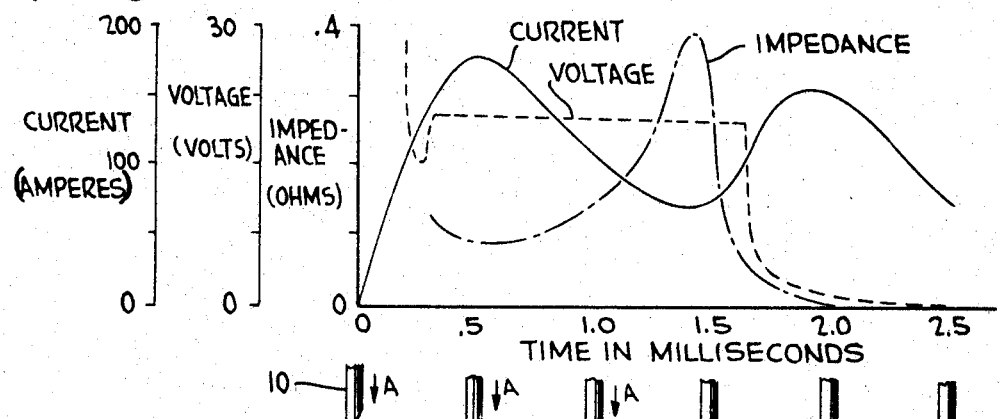
FIG. 3 shows current, voltage and impedance curves for an ideal percussive welding cycle and further illustrates the relationships between a lead and stud at certain times during the welding cycle.

FIG. 3 illustrates optimum or ideal voltage, current and impedance curves plotted against welding time and in addition, depicts the approximate positional relationships between the lead 10 and the stud 11 at successive 0.5 millisecond intervals throughout an ideal cycle.

As an examination of FIG. 3 will bear out, the initial peak welding current occurs 0.5 millisecond after the welding cycle begins. This peaking is indicative of the fact that peak power is being dissipated at this instant to strike the welding arc. It may also be seen from FIG. 3 that the arc voltage can be expected to remain practically constant from time $t=0.5$ millisecond to $t=1.6$ milliseconds and throughout the period from arc striking to arc extinguishment. Consequently, the illustrated ideal impedance curve can be expected to appear as an inverse function of the ideal current curve with its minimum value of impedance occurring immediately prior to arc extinguishment.

Following the welding sequence as depicted by FIG. 3, as the lead 10 is driven in the direction of arrow A toward the stud 11, an arc is struck between the lead and the stud. The current for this arc is obtained from the discharge of the capacitor 16, FIG. 1, and the amplitude of the current is sufficient to melt the beveled tip of the lead 10 and a small portion of the stud 11. The lead 10, FIG. 3, will proceed to burnback from $t=0$ to substantially $t=1.5$ milliseconds. If an optimum velocity is provided the lead 10 during the burnback interval, approximately 50% of the energy initially stored in the capacitor 16 will be dissipated.

During the lead burnback interval, the angle of the beveled tip of the lead 10 primarily determines the mass of the molten material formed at the tip. As the cross-sectional area of the lead tip increases because of the molten material thereon, the rate of the lead burnback decreases. The arc will be extinguished when the lead velocity exceeds the rate of lead burnback and physical contact occurs between the lead and stud. The extinguishment of the welding current arc is shown as occurring 1.5 milliseconds after the welding cycle is initiated and within one or two tenths of a millisecond after the current waveform dips to its first minimum level. Arc extinguishment is characterized by the current curve beginning a relatively smooth upward rise to a second peak of lower amplitude than the peak produced at arc striking. After arc extinguishment, the current waveform follows the decay characteristics of the capacitor 16 and the weld fillet begins to cool and harden.

Figure 4:
FIG. 4 shows an ideal current waveform and depicts an amplitude range within which the current should ideally peak.
Figure 4:
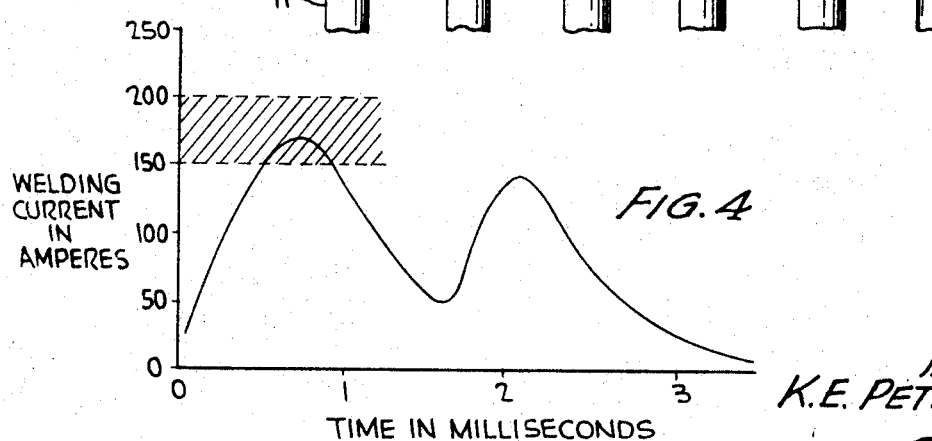

FIG. 4 depicts an ideal current waveform which peaks during the striking of the welding arc in an acceptable amplitude range of, for example, between 150 and 200 amperes of welding current. In accordance with one criterion of this invention, if the current produced during the striking of the welding arc fails to peak within this prescribed range, the weld should be rejected as a probable failure.

Figure 5:
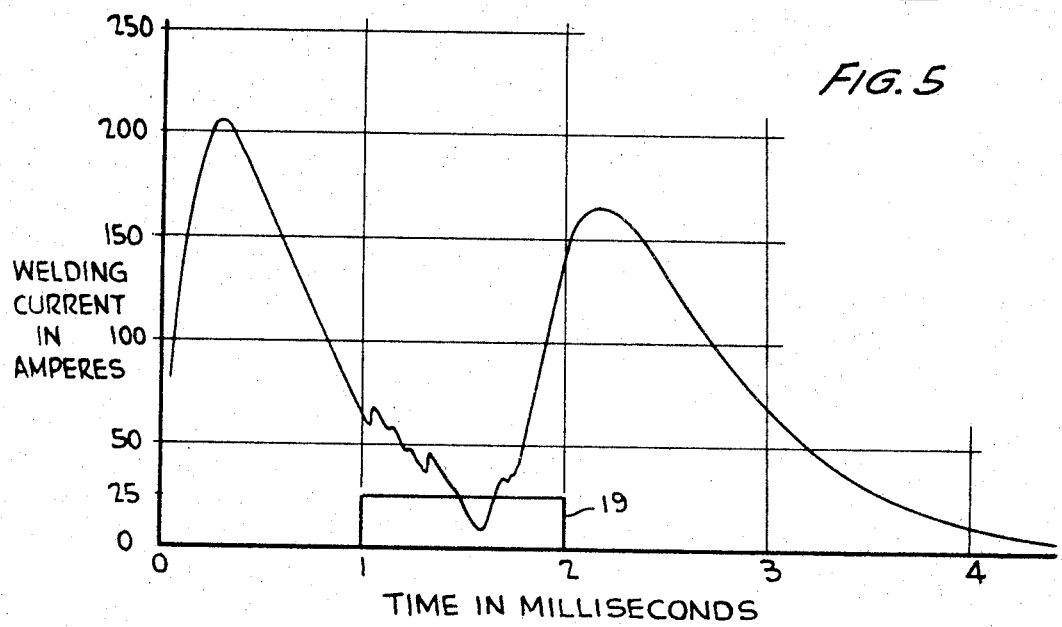
FIG. 5 illustrates a plot of a typical current waveform having a transient that dips into the monitoring window.

FIG. 5 illustrates what may be considered as a current waveform that is exemplary of an unsatisfactory weld in that the waveform peaks above prescribed 150–200 ampere range. This waveform may be obtained from an oscilloscope having a persistence characteristic as an analog representation of the welding current produced during a percussive welding cycle. In addition, there is manifested the presence of current or impedance transients from time $t=1.0$ to $t=1.7$ milliseconds. These transients appear as irregularities or abrupt departures from the smooth, continuous shape of the ideal waveform and can be expected to occur immediately prior to the extinguishment of the arc at time $t=1.7$ milliseconds. A rectangular "window," designated by the numeral 19, is provided for determining the duration of transients that may dip into the window. In accordance with a preferred embodiment of this invention, the window 19 is formed by a rectangular pulse having an empirically determined amplitude and pulse width.

However, the term "window" as used herein, is contemplated as including a suitably scaled rectangular outline on a transparent sheet; the outline or window being delineated by, for instance, ink or pencil lines. The transparent sheet may be applied as a transparent overlay to photographs of welding current waveforms obtained from oscilloscopes. The presence and duration of current transients within the rectangular outline may be observed and measured to detect, for instance, possible trends in the performance of the welding apparatus.

The window 19 illustrated as having a height of 25 amperes and a width of at least 200 microseconds. However, since the time at which the arc extinguishes may be subject to a time variance of several hundred microseconds, the width of the window 19 is preferably increased to span a greater interval of time than 200 microseconds, for example, one millisecond. Not only must the current transient dip into the window 19, as illustrated by FIG. 5, but it must remain continuously therein for 200 microseconds before the weld can be validly classified as a probable failure.

*Brief description of invention*

Figure 6:
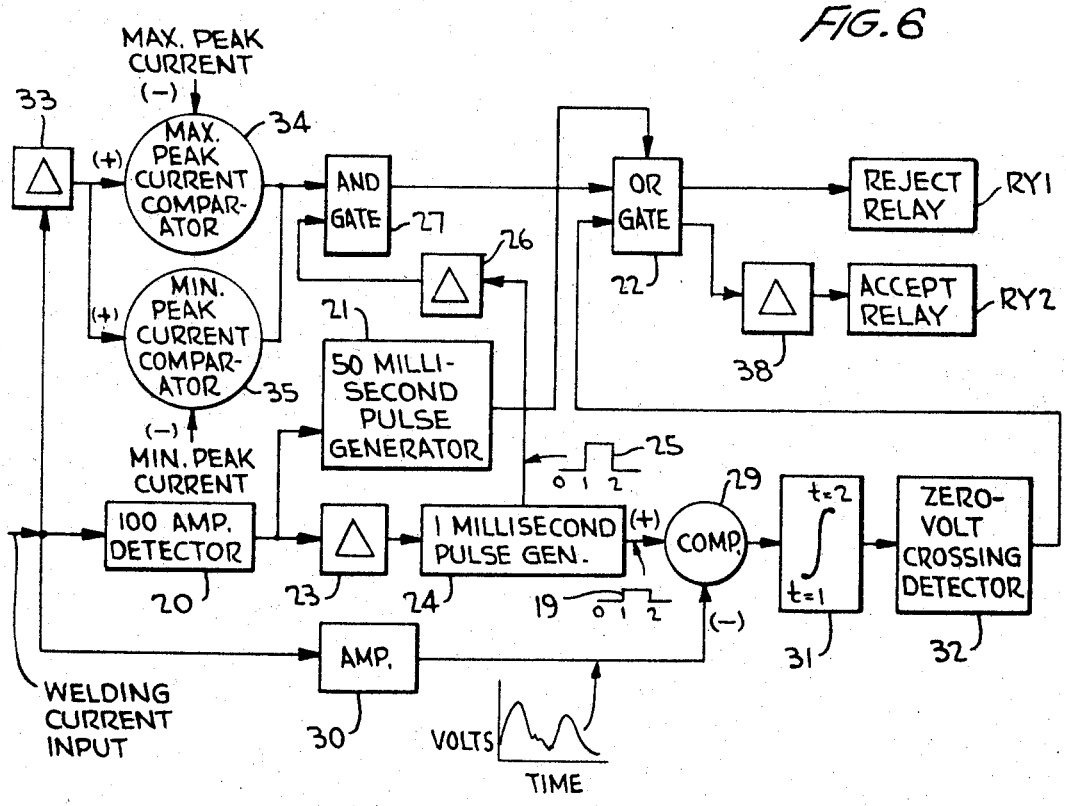
FIG. 6 is a block diagram of a novel system for implementing the method of the instant invention.

Referring to FIG. 6 of the drawings, there is shown a block diagram of a preferred embodiment of a facility for implementing the method of the instant invention.

The welding current waveform is supplied as an input signal to the system and a 100 ampere detector 20 is initiated when the amplitude of the welding current rises initially to the 100 ampere threshold level. The detector 20 thereupon produces an output signal which triggers a pulse generator 21 to generate a 50 millisecond pulse. This pulse acts as a gating signal to enable an OR gate 22 to operate for a 50 millisecond period which is normally considerably longer than the period of a typical percussive welding cycle.

When the detector 20 is initiated, it operates through a time delay circuit 23 to trigger a pulse generator 24. The pulse generator 24 produces a one millisecond positive pulse which acts as a standard signal to form the window pulse 19, FIGS. 4 and 5. The leading edge of the one millisecond window pulse 19 is delayed by the operation of the time delay 23, to rise one millisecond after the generation of the leading edge of the 50 millisecond enabling pulse. The pulse generator 24 simultaneously produces a one millisecond timing pulse 25 which is applied through a time delay circuit 26 and acts as a control signal to enable an AND gate 27, for reasons that will be related subsequently.

The one millisecond window pulse or standard signal 19 is applied as one input to a comparator 29 and a voltage signal, forming a monitoring signal which follows the welding current input, is supplied by an amplifier 30 to the comparator 29 as another input. If the current waveform dips into the window 19, FIG. 5, the comparator 29, FIG. 6, produces an output voltage or start signal which is integrated by an integrator 31.

The integrator 31 will integrate any output signal produced by the comparator 29 during the one millisecond monitoring interval, but unless the current waveform remains continuously in the window for more than 200 microseconds, the output of the integrator 31 will not rise above zero volts. If the output of the integrator 31 does not rise above this zero-volt threshold level, a zero-volt crossing detector 32 will not be triggered.

Assuming that the current waveform dips into the window 19 and remains continuously therein for at least 200 microseconds, a time variable signal forming the output of the integrator 31 will rise above the prescribed threshold level and trigger the detector 32. When the detector 32 is triggered, it produces an output signal which gates through the enabled OR gate 22 and energizes a reject relay RY1. The reject relay RY1 thereupon operates through conventional means (not shown) to record or otherwise indicate to an operator the fact that the weld is unsatisfactory in at least one characteristic.

The reject relay RY1 is also energized if it is determined that the peak of the welding current is less than a predetermined minimum amplitude or greater than a predetermined maximum amplitude. To effectuate this determination, after a suitable time delay provided by a time delay circuit 33, two comparisons are made coincidentally; one by a maximum peak current comparator 34 and the other by a minimum peak current comparator 35. If the peak amplitude of the current waveform monitored by the comparators 34 and 35 does not fall within the range prescribed by maximum and minimum reference biases, the AND gate 27 will receive a voltage signal or control signal from one of the comparators 34 or 35. This voltage signal will remain on the associated input lead of the AND gate 27 until the pulse 25 enables the AND gate 27. The timing pulse 25 appears as an enabling control signal for the AND gate 27 approximately two milliseconds after the OR gate 22 is enabled by the 50 millisecond pulse from the pulse generator 21, and approximately 100 microseconds after the trailing edge of the window 19 is formed. If the enabled OR gate 22 is gated by an output pulse from the AND gate 27, it will energize the reject relay RY1 to indicate that the weld is unsatisfactory.

In the event the welding current waveform has a peak amplitude which falls within an acceptable range as defined by the reference biases applied to the comparators 34 and 35, and also does not dip into the window 19 and remain continuously therein for the prescribed interval of 200 microseconds, the OR gate 22 will not be gated and after a predetermined period of time, established by a time delay circuit 38, an accept relay RY2 will be energized to indicate that the monitored weld has passed both tests imposed thereon.

*Detailed description of invention*

Figure 7A:
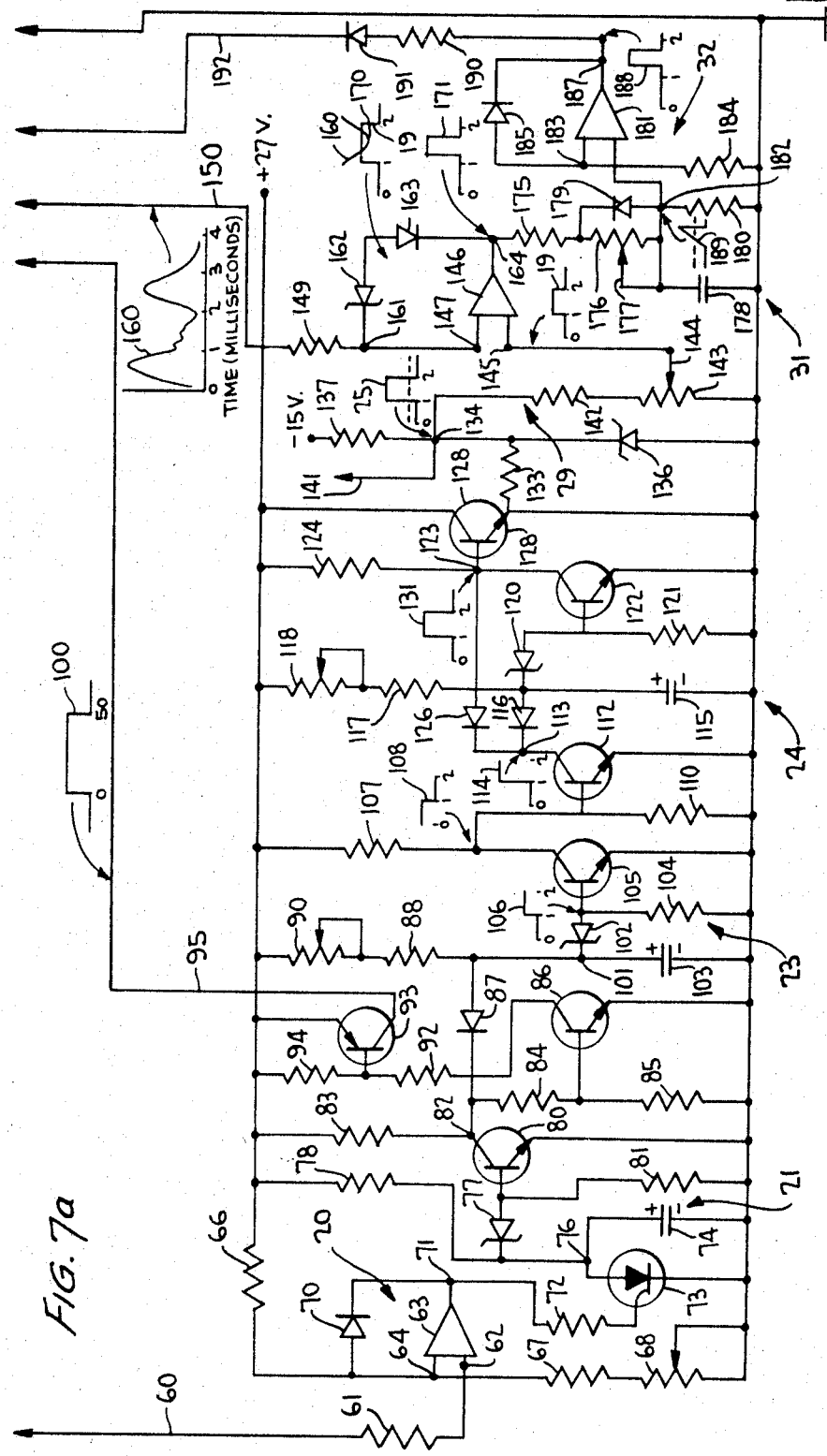
FIGS. 7a and 7b, when considered together, schematically illustrate the detailed circuitry of the system that is constructed in accordance with the principles of this invention.
Figure 7B:
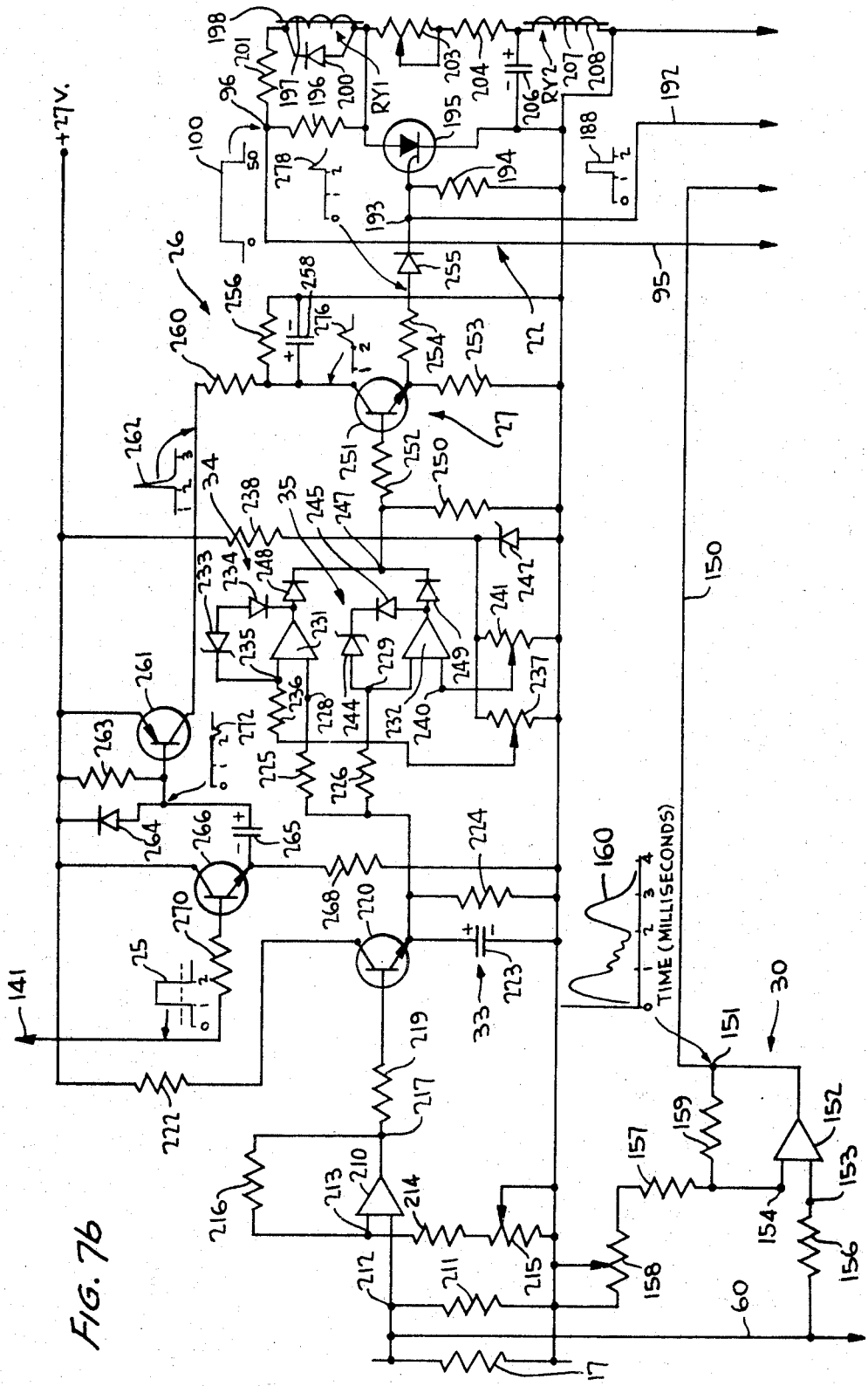

Referring to FIG. 7b, wherein corresponding numbers refer to corresponding blocks in FIG. 6, the resistor 17 is selected to provide an impedance of 2 millivolts per ampere to current flow therethrough, as related above. The voltage across the resistor 17 is applied by a lead 60, FIG. 7a, to a resistor 61 and hence to one input terminal 62 of a high-gain differential amplifier 63.

Another input terminal 64 of the amplifier 63 is connected to one side of a resistor 66 having the other side connected to a +27 volt battery and the terminal 64 is also connected to one side of a fixed resistor 67 that is coupled through a variable resistor 68 to ground. The values of resistors 66, 67 and 68 are selected so that the input terminal 64 is biased at +0.2 volt.

The amplifier 63 is internally biased at −15 volts and a diode 70 is connected between the input terminal 64 and an output terminal 71 to clamp the output terminal 71 at −0.6 volt while the amplifier is in quiescence. When the amplitude of the voltage on the terminal 62 exceeds +0.2 volt, the amplifier 63 is rendered conductive and the voltage at the output terminal 71 rises sharply to typically +12 volts.

The +0.2 volt bias that is applied to the amplifier 63 to hold the amplifier in a normally quiescent state, is purposely selected to be equal to the voltage drop which will appear across the 2 millivolt-per-ampere resistor 17 when 100 amperes of current flow through that resistor. Thus, until the current through the resistor 17 rises to an amplitude of at least 100 amperes, the amplifier 63 remains in its quiescent state by the bias applied thereto. It may be recalled that the 100 ampere level is selected because the extraneous noise which may be introduced into the monitoring system of the instant invention by the operation of the percussive welding apparatus is usually minimal after the amplitude of the welding current reaches the 100 ampere level.

The output terminal 71 of the amplifier 63 is coupled through a resistor 72 to the gate of a conventional silicon-controlled rectifier 73. The SCR 73 is normally held non-conductive, or in a turned-off state, while the amplifier 63 is in its quiescent state and its output terminal 71 is at −0.8 volt. The SCR 73 is rendered conductive, or is turned on, by the amplifier 63 conducting and driving the voltage at the output terminal 71 positive.

An electrolytic capacitor 74 of indicated polarity is connected across the emitter terminals of the SCR 73. The positive plate of the capacitor 74 is connected to one emitter terminal 76 which is normally maintained at a +6.2 voltage level by a Zener diode 77 having a reverse breakdown voltage rating of +6.2 volts. The positive plate of the capacitor 74 and the cathode of the Zener diode 77 are also commonly connected to the lower end of a current-limiting resistor 78 having its upper end connected to the +27 volt line.

A transistor 80 having a base-to-emitter resistor 81 is held in a normally conductive state by the +6.2 voltage that is maintained across the resistor 81 by the Zener diode 77. The transistor 80 is turned off when this voltage drops to zero volts by reason of the SCR 73 turning on and dropping the voltage on its emitter terminal 76 to ground. Thus, the respective conductive states of the SCR 73 and the transistor 80 are 180 degrees out-of-phase.

The collector of the transistor 80 forms a terminal 82 which is common to a collector resistor 83 and to resistors 84 and 85. The resistors 84 and 85 form a voltage-divider across the base of a normally turned-off NPN transistor 86. A diode 87 has its cathode connected to the one end of the voltage-divider and its anode connected to the +27 volt line through a fixed resistor 88 and a variable resistor 90. The diode 87 blocks current flow from the terminal 82 to the junction formed by the anode of the diode and the lower end of the resistor 88. The transistor 86 is held in a turned off state by the normally conducting transistor 80, in effect, shunting the current that flows through the diode 87 from the voltage-divider.

When the amplifier 63 is driven out of its normally quiescent state, the SCR 73 turns on. The positive plate of the previously charged capacitor 74 discharges through the SCR 73 to ground with an R-C time constant, determined by the values of the capacitor 74 and the resistor 78 thereby dropping the voltage on the terminal 76 to ground. Although the SCR 73 subsequently turns off when the current through the resistor 17 (FIG. 7B) falls below 100 amperes, as normally occurs between the 0.5 and 1.0 millisecond interval, FIGS. 3 and 5, the cathode of the Zener diode 77 remains at the zero voltage level for a predetermined period thereafter because of the R-C time constant that is now provided by the capacitor 74 charging through the resistor 78. The values of the capacitor 74 and the resistors 78 and 81 may be selected such that once the SCR 73 is turned on, an interval of at least 50 milliseconds elapses during which time the cathode of the Zener diode 77 remains at substantially zero volts.

At the termination of this 50 millisecond interval, the voltage on the cathode of the Zener diode 77 rises to the reverse breakdown voltage of that diode and the capacitor 74 recharges. When the transistor 80 turns-off the shunting path across the resistors 84 and 85 opens and current flows through these resistors and into the base of the transistor 86, thereby turning on the transistor 86 for the same 50 millisecond interval that the transistor 80 is turned off.

The collector of the NPN transistor 86 is connected through a resistor 92 to the base of a PNP transistor 93. The resistor 92 and a base-to-emitter resistor 94 form a voltage-divider across the base of the transistor 93. The collector of the transistor is connected by a lead 95 to a terminal 96, FIG. 7b, of the OR gate 22 and associated relay circuits that will be described in greater detail subsequently. Since the resistor 92 is tied to the collector of the NPN transistor 86, the operation of the transistor 93 will follow that of the transistor 86, but the voltage on the collector of the transistor 93 will be 180 degrees out-of-phase with the voltage on the collector of the transistor 86. Thus, during the 50 millisecond interval when the normally turned-off transistor 86 turns on and drops its collector voltage to substantially zero volts, the normally turned-off transistor 93 turns on and raises its collector voltage from zero volts to typically +27 volts for 50 milliseconds, to form an enabling pulse 100. The enabling pulse 100 is transmitted by the lead 95 to the terminal 96, FIG. 7b.

The leading edge of the enabling pulse 100, FIG. 7a, is therefore generated when the amplitude of the current through the resistor 17, FIG. 7b, rises to 100 amperes. For reasons that will become evident subsequently, the width of the pulse 100 determines the interval during which the welding operation is monitored by the system of this invention. The time base of the monitoring operation may be considered as beginning with generation of the leading edge of the enabling pulse 100. Obviously, the width of the enabling pulse 100, FIG. 7a, could be increased or decreased by proportionately increasing or by decreasing the R-C time constant provided by the capacitor 74 and the resistors 78 and 81.

With reference to FIG. 7a, a terminal 101 that is common to the cathode of a Zener diode 102 having a reverse breakdown voltage of preferably +6.2 volts, and to the positive plate of an electrolytic capacitor 103, is normally clamped at zero volts by the normally turned-on transistor 80. A base resistor 104 of a transistor 105 receives current from the Zener diode 102 only when the +6.2 volt reverse breakdown voltage of the Zener diode 102 is exceeded. At all other times, the zero voltage drop across the resistor 104 prevents the transistor 105 from turning on.

The capacitor 103 is normally discharged by virtue of its positive plate being normally at ground potential, but charges to provide a reverse breakdown voltage to the Zener diode 102 when the transistor 80 turns off. The turning off of the transistor 80 therefore not only initiates the generation of the leading edge of the 50 millisecond enabling pulse 100, but in addition, opens the shunt across the capacitor 103 so that the capacitor 103 charges to a voltage that exceeds the reverse breakdown voltage of the Zener 102. The time required for the capacitor 103 to charge to this voltage level is primarily determined by the R-C time constant provided by the resistors 88 and 90 and the capacitor 103, which is preferably one millisecond. Therefore, one millisecond after the transistor 80 turns off the voltage on the terminal 101 exceeds the +6.2 volt reverse breakdown level of the Zener diode 102, the Zener breaks down and conducts current through the base junction of transistor 105 and turns on the transistor 105 for substantially 50 milliseconds. Thus, the leading edge of the 50 millisecond pulse 106 lags the leading edge of the enabling pulse 100 by an interval of one millisecond as determined by the R-C time constant of the resistors 88 and 90 and the capacitor 103.

The transistor 105 includes a collector resistor 107 connected to a resistor 110 to form a voltage divider across the collector terminal of the transistor 105 and across the base terminal of a transistor 112. With the transistor 105 turned off, the voltage divider will provide a voltage on its collector terminal of typically +0.3 volt. Since the base of this transistor is connected to the terminal 101 through the diode 102, the output pulse 108 which appears at the collector of the transistor 105 follows, but is 180 degrees out of phase with the pulse 106 by the corresponding operation of the transistor 105. The leading edge of the pulse 108 is formed by the collector voltage of the transistor 105 dropping from +0.3 volt to zero volts.

The base of the transitor 112 is tied to the collector of the transistor 105, so that the transistor 112 follows the operation of the transistor 105, but inverts and amplifies the pulse 108 that is applied to its base. Stated more specifically, with the base of the transistor 112 at normally +0.3 volt the transistor 112 will be turned on and its collector voltage will be at ground level. The application of the leading edge of the pulse 108 to the base of the transistor 112 operates to turn off the transistor 112 for approximately 50 milliseconds. When the transistor 112 turns off, the voltage on its collector terminal 113 rises sharply to +27 volts to form the leading edge of a 50 millisecond pulse 114.

The positive plate of an electrolytic capacitor 115 is joined to the anode of a diode 116 and to the lower end of a fixed resistor 117. The resistor 117 is coupled through a variable resistor 118 to the +27 volt line. With the transistor 112 normally turned on, current from the +27 volt line flows through the resistors 117 and 118 and through the diode 116 to ground, thereby grounding the positive plate of the capacitor 115. The positive plate of the capacitor 115 is also connected to the cathode of a Zener diode 120 having a +6.2 volt reverse voltage breakdown level. The diode 116 normally clamps the cathode of the Zener diode 120 at zero volts and well below the reverse breakdown voltage level of the Zener 120. The anode of the Zener diode 120 is connected to the upper end of a base resistor 121 of a transistor 122. Since the cathode of the Zener diode 120 is normally at ground potential, the transistor 122 is normally turned off. The transistor 122 has a collector terminal 123 connected to a resistor 124, and to the anode of a diode 126. The resistor 124 forms a base resistor for an emitter-follower 128, and the diode 126 clamps the terminal 123 at ground while the transistor 112 remains turned on.

As related hereinabove, when the zero voltage portion of the pulse 108 is applied to the base of the transistor 112, the transistor 112 is turned off and its collector voltage rises sharply to +27 volts to form the leading edge of the pulse 114. It may be recalled that the leading edge of the pulse 114 lags the leading edge of the enabling pulse 100 by one millisecond because of the one millisecond delay provided by the capacitor 103 and the resistors 88 and 90 to the turning on of the transistor 105.

When the terminal 113 rises sharply from zero volts to +27 volts, the diode 126 is reverse biased and the voltage at the terminal 123 rises from zero volts to +27 to form the leading edge of a +27 volt pulse 131. In addition, the diode 116 is reverse biased and a voltage of typically 6.8 volts now appears across the capacitor 115. The capacitor 115 charges with preferably a one millisecond time delay to a level where the voltage on its positive plate exceeds the reverse breadown voltage of the Zener diode 120. This one millisecond time delay is obtained by choosing suitable values for the capacitor 115 and the resistors 117 and 118 to obtain a one millisecond R-C time constant. Thus, one millisecond after the terminal 113 rises to +27 volts, the voltage on the positive plate of the capacitor 115 exceeds the reverse breakdown voltage of the Zener diode 120 causing the Zener diode 120 to break down, conduct current, and turn on the transistor 122. The turning on of the transistor 122 causes the voltage of the terminal 123, which is now at +27 volts, to drop back to the initial zero-volt level, thereby forming the trailing edge of the pulse 131. The essentially rectangular pulse 131 has a pulse width that is primarily determined by the R-C time constant of the resistors 117 and 118 and the capacitor 115. Obviously, the width of the pulse 131 could be increased or decreased by increasing or decreasing the R-C time constant obtained using these components.

The transistor 128 follows the operation of the transistor 122 and is utilized primarily to effect an impedance match between the circuit to the left of the transistor 128 and the circuit to the right of that transistor. A replica of the pulse 131 therefore appears across a resistor 133 that is joined at one end to the emitter of the transistor 128 and at the opposite end to a terminal 134 and to the cathode of a Zener diode 136.

The Zener diode 136 has reverse breakdown voltage rating of typically +8.5 volts and accordingly clips the +27 amplitude of the received pulse to +8.5 volts. In addition, the terminal 134 is normally clamped at −2 volts by a negative voltage that is applied to this terminal through a resistor 137 having one end thereof connected to a −15 volt source. Thus, the Zener diode 136 acting in conjunction with the resistor 137 and the −15 volt source changes the discrete amplitude levels of the pulse applied to the resistor 133 from zero and +27 volts, respectively to −2 and +8.5 volts, respectively. This pulse is designated by the numeral 25 and is transmitted by a lead 141 to provide a one millisecond gating pulse for the maximum and minimum peak current comparators 34 and 35, respectively, FIG. 7b. The horizontal dotted line extending through the pulse 25, FIG. 7a, corresponds to a selected zero-volt level.

Considering FIG. 7a, again, a resistor 142 has one side connected to the terminal 134 and the other side thereof connected to a variable resistor 143 equipped with a slide arm 144 for tapping off a preselected fraction of the voltage on the resistor 143. With the terminal 134 normally floating at −2 volts, the slide arm 144 may be adjusted so that −0.2 volt is tapped off the resistor 143 and applied as a bias voltage to an input terminal 145 of a high-gain differential amplifier 146. Another input terminal 147 of the amplifier 146 is connected through a resistor 149 to a lead 150; the lead 150, FIG. 7b, being connected to an output terminal 151 of a differential amplifier 152. The differential amplifier 152 has two input terminals; a voltage noninverting terminal 153 and a voltage inverting terminal 154. The terminal 153 is connected to the upper end of the resistor 17 through resistor 156. The terminal 154 is connected to the lower end of the resistor 17 through resistors 157 and 158, the latter being a variable resistor. The resistors 157 and 158 are utilized to adjust the gain of the amplifier 152. With the amplifier 152 in its quiescent state, the voltage on its output terminal 151 and on the upper end of the resistor 149, FIG. 7a, floats at zero volts.

Since the input terminals 153 and 154 of the amplifier 152 are connected across the terminals of the fixed resistor 17, and since there are no components therebetween which would effect a phase shift between the current flowing through the resistor 18 and the voltage produced thereby, the amplitude of the voltage which appears at any instant across terminals 153 and 154 differs from the amplitude of the current flowing through the resistor 17 at that instant by an essentially constant factor which is the value of resistance of the resistor 17. Consequently, the configuration of the voltage waveform that appears on the terminal 153 may be considered, for practical purposes, as being identical to the configuration of the welding current waveform that flows through the resistor 17. The amplifier 152 operates in an analog manner to amplify the input voltage waveform and the resulting amplified waveform appears at the output terminal 151. Assuming that the welding current applied to the resistor 17 has a waveform substantially as illustrated in FIG. 5, the essentially identical waveform configuration that appears on the output terminal 151 is shown in FIGS. 7a and 7b and is referred to by the numeral 160. For reasons related directly above, the waveform 160 may be considered as a voltage signal that is directly proportional to the welding current, or as an analog representation of the welding current waveform. Recalling that the resistor 17 has an assumed impedance equal to 2 millivolts per ampere, the voltage that appears on the terminal 153 may vary from a minimum of zero volts for a possible zero current flow through the resistor 17, to a maximum of +0.5 volt for a possible 250 amperes of current flow through this resistor.

The voltage waveform 160, FIG. 7a, appears on resistor 149, and is applied to a terminal 161. The terminal 161 is common to the lower end of the resistor 149, to the input terminal 147 and to the cathode of a Zener diode 162 which is connected in the negative feedback circuit of the amplifier 146.

The Zener diode 162 has a reverse breakdown voltage of preferably +8.2 volts and the anode of this Zener is connected to the anode of a diode 163; the cathode of the diode 163 being connected to an output terminal 164 of the amplifier 146. With the anodes of the diodes 162 and 163 in a back-to-back relationship and with the slide arm 144 adjusted to tap off −0.2 volt from the resistor 143, the amplifier 146 will be in quiescence and the output of the amplifier 146 will be floating at typically −9 volts by reason of an internal −15 volt bias source, not shown.

With the output terminal 164 floating at −9 volts, current will be drawn through the resistor 149 and through the diodes 162 and 163 so that the voltage at the terminal 161 is held substantially equal to the −0.2 volt bias that is applied to the input terminal 145. Thus, even though a voltage signal, such as the signal 160, appears on resistor 149, as long as this signal remains positive, the voltage on the terminal 161 will be held at substantially the magnitude of the negative bias voltage on the terminal 145, and the voltage on the output terminal 164 will remain substantially constant at −9 volts.

It may be recalled that the one millisecond +8.5 volt pulse 25 appears on the terminal 134 one millisecond after the enabling pulse 100 is generated. The pulse 25 is applied to the resistors 142 and 143 and the fractional voltage that is tapped off by the slide arm 144 follows the shape of the pulse 25, but obviously rises to a lesser amplitude of, for example, +0.5 volt. This one millisecond pulse which is designated by the numeral 19, forms what may be regarded as one millisecond electronic "window" through which transients in the welding current waveform 160 are "observed" by the monitoring system of this invention. The +0.5 volt amplitude of the window 19 corresponds to 25 amperes of welding current through the resistor 17, FIG. 5. The application of the pulse 19 to the input terminal 145 drives the amplifier 146 so that its output goes more positive, typically to a value of −8.5 volts.

If the voltage of the waveform 160 on the upper end of the resistor 149 has a greater amplitude than +0.5 volt during this one millisecond interval, the Zener diode 162 will continue to conduct current from the output terminal 164. Thus, the voltage on the terminal 164 will still remain at substantially its quiescent voltage of −9 volts. Conversely, if the voltage of the signal 160 on the lead 150 has a lesser amplitude than +0.5 volt during this one millisecond interval, the Zener diode 162 will cease conducting and the voltage on the output terminal 164 will rise sharply to, for instance, +15 volts.

Thus, it will be apparent from the foregoing that the amplifier 146 operates essentially as a comparator that produces a positive output signal voltage during the one millisecond monitoring interval every time the amplitude of the current waveform drops below the 25 ampere level as established by the +0.5 volt amplitude of the window pulse 19. The appearance of the welding current waveform 160 in the window 19 is referred to by the numeral 170 in FIG. 7a and is attributable to current transients in the welding current. As related above, since the voltage across the welding arc is usually practically constant during the interval between arc striking and arc extinguishment, FIG. 3, the appearance of current transients in the window 19 may reflect the presence of impedance transients arising, it is believed, from imperfections in the molten fillet. The positive pulse, FIG. 7a, that is produced at the output terminal 164 by the operation of the aforedescribed comparator in response to the appearance of current transients in the window 19, is designated by the numeral 171.

A resistor 175 receives the pulse 171 and applies this pulse to an integrator 31 comprising a variable resistor 176 having a slide arm 177 and a capacitor 178 connected between the slide arm 177 and ground. In addition, a diode 179 is connected in parallel with the resistor 176 to provide a fast response to the trailing edges of the ramp pulses that may be produced thereby. The slide arm 177 is initially adjusted to tap off −5 volts from the output terminal 164 with the amplifier 146 biased into its quiescent state.

A resistor 180 is connected in parallel to the plates of the capacitor 178 and serves as a voltage signal source for a high-gain differential amplifier 181. A terminal 182 forms a signal noninverting input terminal for the amplifier 181 and this terminal is common to the upper end of the resistor 180; the lower end of the slide arm 177; the upper plate of the capacitor 178; the anode of the diode 179; and the lower end of the resistor 176. The voltage on the terminal 182 normally floats at a −5 volts by virtue of the slide arm 177 tapping off this magnitude of negative voltage from the resistor 176.

The amplifier 181 has a signal inverting input terminal 183 that is connected to the upper end of a bias resistor 184 and to the anode terminal of a diode 185. The diode 185 is connected in the negative feedback circuit of the amplifier 181 with its cathode terminal connected to the output terminal 187 of the amplifier 181. With −5 volts applied to the input terminal 182 and with −15 volts of internal bias applied to the amplifier 181, and voltage on the output terminal 187 floats at typically −5.7 volts.

The voltage on the cathode of the diode 185 is therefore pulled down to substantially −5.7 volts. Assuming that the diode 185 has a forward voltage drop of 0.7 volt current normally flows from ground through the resistor 184 to the input terminal 183 so that the input terminal 183 normally floats at −5 volts. The diode 185 in the negative feedback circuit of the amplifier 181 operates to clamp the output terminal 187 at substantially the −5.7 volt level until the voltage at the terminal 182 exceeds the zero voltage level of the lower end of the resistor 184. If the voltage on the terminal 182 rises from −5 volts to zero volts, the amplifier 181 is driven out of its normally quiescent state, conducts heavily, and the voltage on the output terminal 187 rises sharply to typically +15 volts.

The operation of the aforedisclosed circuit between the terminals 164 and 187 is summarized as follows:

If the current waveform 160 dips into the window 19, it is reflected by a sharp voltage rise at the terminal 164 which forms the leading edge of the +15 volt pulse 171. The voltage across the resistors 175 and 176 rises proportionately such that the voltage tapped off the resistor 176 by the slide arm 177 rises rapidly to a positive value, typically +5 volts. The capacitor 178 and the resistor 180 integrate this voltage to produce a ramp voltage on the terminal 182. If the amplitude of the ramp voltage on the terminal 182 exceeds the threshold level of zero volts, as indicated by numeral 189 in FIG. 7a, the amplifier 181 is triggered into saturating and driving the voltages on its output terminal 187 from —5.7 volts to +15 volts. Since the capacitor 178 and the resistors 175, 176 and 180 integrate the voltage pulse 171 and since the +15 volt amplitude of the pulse 171 remains essentially constant while the amplifier 146 remains saturated, whether or not the ramp voltage rises above the threshold zero voltage level depends upon the length of time that the pulse 171 remains at +15 volts. Preferably, and for reasons related hereinabove, the values of the capacitor 178 and the resistors 175, 176 and 180 are selected so that the ramp voltage that appears on the terminal 182 will not rise above the zero voltage level unless the pulse 171 remains at +15 volts for at least 200 microseconds during the one millisecond monitoring interval. Obviously, the current waveform 160 must dip into and remain continuously in the window 19 for at least 200 microseconds before the voltage on the terminal 182 rises above zero volts.

As discussed hereinabove, if the current waveform dips into the monitoring window 19 and remains therein for more than 200 microseconds, the weld should be rejected. Further, if the waveform 160 appears more than once in the window, but does not remain continuously therein for at least 200 microseconds at any time during the one millisecond monitoring interval, the voltage on the terminal 182 will not rise above the zero volt triggering level of the detector 32. Under these conditions the weld is deemed satisfactory. The capacitor 178 and the resistors 175, 176 and 180 will continue to integrate during the one millisecond monitoring interval as long as the waveform 160 remains in the window and holds the amplifier 146 in saturation.

The trailing edge of the pulse 171 is generated either by the waveform 160 rising up and out of the window 19 or, in the event that the amplitude of the waveform 120 remains below the height of the window 19 for more than one millisecond after entering the window, by the negative-going trailing edge of the window 19 driving the amplifier 146 back into its quiescent state.

Every time the amplifier 146 is driven back into a state of quiescence, the voltage on the terminal 164 drops to a negative value and terminates the voltage integrating by the capacitor 178 and the resistors 175, 176 and 180. The diode 179 operates at the termination of each integrating operation to shunt the voltage on the terminal 182 to the junction of the resistor 175 and the variable resistor 176 so that the voltage on the terminal 182 drops rapidly to the quiescent —5 volt level. As mentioned above, the trailing edge of the pulse 189 is generated by either the trailing edge of the pulse 171 or the trailing edge of the window 19, whichever occurs first in time. Thus, the amplifier 181 serves primarily as a zero-voltage crossing detector that produces an output voltage pulse 188 that is indicative of a probable weld failure condition whenever the ramp voltage 189 rises above zero volts.

The terminal 187 is connected through a current limiting resistor 190 and a diode 191 to a lead 192. Referring to FIG. 7b, the lead 192 forms a terminal 193 with one end of a gate resistor 194 of a silicon-controlled rectifier 195. With the terminal 187, FIG. 7a, normally floating at substantially —5 volts, the diode 191 is reverse-biased such that the SCR 195, FIG. 7b, is rendered nonconductive.

The SCR 195 has its upper emitter junction joined to the lower end of a resistor 196 and to the lower end of a normally deenergized reject relay RY1 comprising a coil 197 and a movable core 198. A diode 200 is connected in parallel across the relay RY1 and is oriented to shunt current that may flow toward the lower end of the relay RY1 from the relay coil 197. The cathode of the diode 200 is coupled through a resistor 201 to the terminal 96. The resistor 196 offers a lower impedance to current than is offered by the resistor 201 and the relay RY1 and therefore, when the enabling pulse 100 is applied to the terminal 96, the resistor 196 shunts this pulse to a variable resistor 203 and a fixed resistor 204 to charge an electrolytic capacitor 206 of indicated polarity.

The capacitor 206 is connected across the terminals of a normally deenergized accept relay RY2 formed by a coil 207 and movable coil 208. The resistors 203 and 204 and the capacitor 206 provide a delay, of typically 25 milliseconds, from the time that the pulse 100 appears on the terminal 96 to the time when the capacitor 206 charges to a voltage sufficient to energize the accept relay RY2. The relay RY2 is therefore energized 25 milliseconds after the welding current rises to the 100 ampere level unless the SCR 195 is rendered conductive during this 25 millisecond interval by a reject signal applied to the terminal 193. The energization of either relay RY1 or RY2 causes a displacement of the cores 198 and 208, respectively, which movement may be utilized to operate any suitable mechanism that is capable of indicating and/or recording, for example, the determination that the monitored weld is either satisfactory or unsatisfactory.

The SCR 195 will be rendered conductive if its gate resistor 194 receives a positive reject pulse 188 from the window monitoring circuit described above coincidentally with the enabling pulse 100. Once the SCR 195 is turned on by a positive pulse applied to its gate, it will remain turned on as long as the enabling pulse 100 remains on its upper emitter terminal. When the SCR 195 turns on, ground appears at the junction between the reject relay RY1 and the resistor 203, and the relay RY1 becomes energized by the enabling pulse 100 and stays energized for the remaining duration of the pulse 100.

The SCR 195 is also triggered into conduction during the 50 millisecond interval by a voltage that is derived from the peak current comparators 34 and 35. As will be disclosed in detail subsequently, during the one millisecond monitoring interval a comparison is effected by the comparators 34 and 35 between the peak amplitude of the welding current waveform and preestablished maximum and minimum current limits. The SCR 195 is turned on if the welding current fails to peak within a range defined by these limits.

Referring again to the left end of FIG. 7b, a differential amplifier 210 that may be identical to the amplifier 152 also produces an output voltage having substantially the same configuration as that of the welding current waveform which flows through the resistor 17. The amplifier 210 includes an input resistor 211 connected in parallel with the resistor 17 to provide an input voltage to a signal noninverting terminal 212 of the amplifier 210. A voltage inverting terminal 213 of the amplifier 210 is coupled to ground through a fixed resistor 214 and a variable resistor 215. The negative feedback circuit of this amplifier includes a resistor 216 having one side thereof connected to an output terminal 217.

With the input terminal 212 floating at zero volts, the amplifier 210 will be in a quiescent state and its output terminal 217 will also be floating at zero volts. The application of the positive voltage signal 160 to the resistor 211 will drive the input terminal 212 positive, causing the amplifier 210 to conduct in an analog manner such that its output voltage rises to follow the leading edge of the positive-going welding current waveform. This increasing output voltage is applied to a base resistor 219 of a normally turned off emitter-follower transistor 220 to turn on this transistor. The transistor 220 has a resistor 222 in its collector circuit and an electrolytic capacitor 223 of indicated polarity and a resistor 224 connected in parallel in its emitter-to-ground circuit. Two resistors 225 and 226 couple the emitter junction of the transistor 220 to the voltage noninverting and inverting terminals 228 and 229, respectively, of differential amplifiers 231 and 232, respectively.

The value of the reflected impedance, that is, the impedance as viewed from the emitter junction of the emitter follower 220 is expressable by the relationship $Z/1+\beta$ where $\beta$ is the gain of the transistor and Z is the impedance of the transistor base. Thus, assuming that the transistor 220 has a gain of approximately 20 and the base an impedance of 1K ohms, the reflected impedance of the transistor will be on the order of 50 ohms. In addition, assuming that the capacitor 223 has a value of one microfarad, the R-C time constant of this circuit will be on the order of 50 microseconds. Consequently, when the transistor 220 is turned on by the positive-going portion of the waveform 160, the capacitor 223 will charge with a 50 microsecond time delay to the peak value of the voltage waveform. After the waveform 160 peaks, its voltage goes more negative and the base junction of the transistor 220 is reverse-biased by this negative-going voltage. The now-charged capacitor 223 thereupon discharges at a rate determined by the R-C time constant of the parallel combination of the resistors 224, 225 and 226 and the capacitor 223. The value of this R-C time constant is typically on the order of 50 milliseconds. It will be evident, that the aforedescribed circuit operates as a detector of the peak welding current during the one millisecond monitoring interval.

The amplifier 231 is preferably similar to the aforedescribed amplifier 146 and also includes a Zener diode 233 having a +8.2 reverse breakdown voltage rating and a diode 234 connected in the same back-to-back relationship. The cathode of the Zener 233 is connected to a voltage inverting terminal 235. The voltage inverting terminal 235 is connected to ground through resistors 236 and 237, the latter resistor being a bias resistor that is adjustable to tap off a predetermined bias voltage obtained from a one watt resistor 238 that is connected to the +27 volt supply. The signal noninverting terminal 240 of the amplifier 232 is also connected through a variable bias resistor 241 to the resistor 238.

A Zener diode 242 having a reverse-voltage breakdown rating of typically +8.5 volts operates to clamp the voltage at the common junction of the resistors 237, 241 and the resistor 238 to a maximum level of +8.5 volts. The resistor 238 and the Zener diode 242 are primarily utilized to compensate for voltage fluctuations which may appear across the resistors 237 and 241 resulting from temperature changes that may occur during the operation of the amplifiers 231 and 232 and their terminal circuitry.

The amplifier 232 is preferably similar to the amplifier 231, with the exception, that the two diodes 244 and 245 in the negative feedback circuit of the amplifier 232 have their cathodes connected together to hold the amplifier 232 in its normally quiescent state until the voltage on the voltage inverting terminal 229 falls below the level of a predetermined bias voltage that is impressed upon the voltage noninverting terminal 240. The bias voltages that are impressed upon the voltage inverting terminal 235 of the amplifier 231 and upon the voltage noninverting terminal 240 of the amplifier 232 respectively establish maximum and minimum amplitude limits for the peak of the current waveform during the one millisecond monitoring interval. Thus, the amplifiers 231 and 232 and associated sources of bias comprise the maximum and minimum current comparators 34 and 35, respectively, that are illustrated in FIG. 6.

For satisfactory welds, the welding current waveform should peak within a range of between 150 and 200 amperes, or between +3 and +4 volts. The two acceptable peaking limits are established by adjusting the variable resistor 237 until +4 volts of bias is impressed upon the terminal 235 and by adjusting the variable resistor 241 until +3 volts of bias is impressed upon the terminal 240. With these respective values of voltages on the terminals 235 and 240, the voltage on the common output terminal 247 will float at typically −9 volts when the welding current is within the specified limits. Diodes 248 and 249 have their cathodes connected to the terminal 247 and therefore isolate the output terminals of the amplifiers 231 and 232 from one another when the voltage on either amplifier output terminal rises to a positive level.

The peak voltage of the welding current is stored by the capacitor 223 and applied to the input terminals 228 and 229 of the amplifier 231 and 232, respectively. It should be apparent that a positive voltage will appear on the terminal 247 only if the peak amplitude of the welding current is greater than 200 amperes or less than 150 amperes, or expressed in terms of voltage, if the peak voltage is greater than +4 volts or less than +3 volts. The absence of a positive pulse on the terminal 247 indicates that the amplitude of the peak current falls within the range established by the voltage biases of +3 and +4 volts.

The common output terminal 247 of the peak current comparators 34 and 35 is tied to ground through a resistor 250 and is connected to the base of a grounded-emitter transistor 251 through a base resistor 252. The transistor 251 and its terminal circuitry form the AND gate 27 for gating a voltage signal derived from a peak current comparators 34 and 35 to the SCR 195. The emitter junction of the transistor 251 is grounded through a resistor 253, and in addition is coupled through a resistor 254 to the anode of a diode 255. The cathode of the diode 255 is also connected to the gate terminal 193 of the SCR 195.

The collector of the transistor 251 is coupled to ground through an R-C combination of a ressitor 256 and an electrolytic capacitor 258 of indicated polarity. The R-C combination is tied to the lower end of a collector resistor 260 of a normally turned off transistor 261. The resistors 256 and 260 and the capacitor 258 provide an R-C time constant of typically 100 microseconds to the leading edge of a positive pulse 262 that is applied to the collector of the transistor 261 during each monitoring operation. The resistor 256 and the capacitor 258 provide an R-C time constant of approximately 330 microseconds to the trailing edge of the pulse 262. The leading edge of the pulse 262 is generated by the turning on of the transistor 261 and the trailing edge of the pulse 262 is generated by the turning off of the transistor 261.

The base circuit of the transistor 261 includes a bleed resistor 263 and a diode 264 connected in parallel. An electrolytic capacitor 265, of indicated polarity, has its positive plate connected to the resistor 263 and hence to the +27 volt supply and its negative plate is connected to the emitter of a transistor 266. The emitter of the transistor 266 is connected to ground through a resistor 268 and its base is connected to the lead 141 through a base resistor 270.

It may be recalled that the lead 141 is connected to the terminal 134, FIG. 7a, which normally floats at a negative voltage level of typically −2 volts. With the terminal 134 at −2 volts, the transistor 266, FIG. 7b, is biased to turn off and ground appears on the negative plate of the capacitor 265. Since a capacitor will block D.C. current flow therethrough, the positive plate of the capacitor 265 will float at the voltage of the +27 volt supply and this positive voltage will keep the transistor 261 turned off. With the transistor 261 normally turned off, the collector of the transistor 251 will be at zero volts and the AND gate 27 therefore normally disenabled.

The generation of an enabling pulse for the AND gate 27 is initiated when the pulse 25 appears on the line 141 to turn on the transistor 266. As discussed hereinabove, the pulse 25 is generated simultaneously with the generation of the one millisecond monitoring window 19 and has an amplitude of typically +8.5 volts.

When the transistor 266 is turned on by the pulse 25, the voltage level of the negative plate of the capacitor 265 is raised by 8.5 volts causing the capacitor 265 to discharge through the resistor 263 and the diode 264 until the voltage on the positive capacitor plate drops to +18.5 volts. The transistor 266 is turned off by the negative-going trailing edge of the pulse 25 and with the result that the negative plate of the capacitor 265 drops back to zero volts. In response to its negative plate dropping to zero volts, the capacitor 265 tries to maintain its previous voltage and therefore charges through the resistors 263 and 268 with a delay that is primarily determined by the R-C time constant of the resistor 268 and the capacitor 265. This time constant is typically on the order of 100 microseconds, and the 100 microsecond negative-going pulse that is produced at the base of the transistor 261 to turn on this transistor is designated by the numeral 272 in FIG. 7b.

The negative-going leading edge of the pulse 272 turns on the transistor 261 for 100 microseconds after $t=2$ milliseconds to produce a 100 microsecond positive pulse 262 having an amplitude of typically +27 volts. The pulse 262 is transformed into an enabling pulse 276 having a 100 microsecond pulse width and an amplitude of approximately +20 volts. The pulse 276 enables the transistor 251 to gate through a positive voltage that is produced on the terminal 247 by an out-of-limits peaking of the welding current. If the transistor 251 produces a positive output signal, as indicated at 278, the diode 255 will pass this signal to the terminal 193 to drive the SCR 195 into initiating the reject relay RY1.

For reasons disclosed hereinabove, if 25 milliseconds of the welding cycle elapse and neither terminal 187 nor 247 receives a positive pulse indicating an unsatisfactory weld condition, the capacitor 206, FIG. 7b, will energize the accept relay RY2.

The instant invention will provide a high degree of discrimination between acceptable and unacceptable welded assemblies. For instance, failure tests performed on over two thousand monitored welded assemblies of the type described above, established that the system of this invention could be relied upon to discriminate between acceptable and unacceptable welds with a probability of 99.95%.

It is believed that the operation of the above-described embodiments of this invention will be apparent from the foregoing description, and it is obvious that various changes and modifications may be made without departing from the spirit and scope of the invention. For example, a suitably designed monostable multivibrator could be substituted for the pulse generator 24 to generate a one millisecond pulse of the desired amplitude.

What is claimed is:

1. A method of obtaining an indication of probable weld failure from a time-varying percussive welding current produced by a percussive welding apparatus, the method comprising:

generating an analog signal having a time-varying amplitude which corresponds to the time-varying amplitude of the welding current;

measuring the greatest length of time within a predetermined time interval commencing after arc striking and extending to at least arc extinguishment that the amplitude of the analog signal remains continuously less than a predetermined minimum amplitude; and comparing the measured greatest length of time to a predetermined time value to obtain an indication of weld failure probability.

2. A method of obtaining an indication of probable weld failure from a time-varying percussive welding current produced by a percussive welding apparatus, the method comprising:

generating an analog signal having a time-varying amplitude which corresponds to the time-varying amplitude of the welding current;

measuring the greatest length of time within a predetermined time interval commencing after arc striking and extending to at least arc extinguishment that the amplitude of the analog signal remains continuously less than a predetermined minimum amplitudee comparing the measured greatest length of time to a predetermined time value to obtain one indication of weld failure probability;

forming a predetermined range of amplitudes that correlate with an acceptable weld condition; and detecting the presence of the striking arc in the predetermined amplitude range to obtain another indication of weld failure probability.

3. The method as defined in claim 2 which comprises the additional step of:

recording either indication of weld failure probability.

4. A method of obtaining an indication of probable weld failure from a time-varying percussive welding current produced by a percussive welding apparatus, the method comprising:

generating an analog signal having a time-varying amplitude which corresponds to the time-varying amplitude of the welding current;

applying a substantially rectangular window to the generated signal, the window having a height dimension and a width dimension corresponding to a predetermined signal-monitoring time interval;

measuring the longest continuous length of time during the interval that the signal dips below the height of the window; and comparing the measured time with a predetermined standard to obtain an indication of weld failure probability.

5. A system for obtaining an indication of probable weld failure from a time-varying percussive welding current produced by a percussive welding apparatus, the system comprising:

means connected in the welding apparatus for receiving and converting the welding current to an analog voltage signal that varies in amplitude as a function of the instantaneous amplitude of the welding current;

first signal detecting means coupled to the current converting means for producing an output signal when the amplitude of the voltage signal initially attains a predetermined amplitude;

means responsive to the output signal from said first signal detecting means for generating a voltage pulse having a predetermined amplitude that corresponds to a predetermined minimum welding current amplitude and a predetermined width that corresponds to a predetermined current-monitoring time interval;

voltage amplitude comparing means connected to receive the voltage signal from said current converting means and the voltage pulse from the pulse forming means, said voltage comparing means producing a difference signal which increases in amplitude as long as the amplitude of the voltage signal remains continuously less than the coincidental amplitude of the voltage pulse;

means coupled to said voltage comparing means for integrating the difference signal produced thereby and providing an integrated output signal having an amplitude which is a function of the length of time that the voltage signal remains continuously less than the coincidental amplitude of the voltage pulse;

second signal detecting means connected to receive an integrated output signal from the integrating means for producing a reject signal when the amplitude of the integrated output signal exceeds a predetermined amplitude; and indicating means coupled to the said second signal detecting means and operated by a reject signal therefrom to indicate a condition of probable weld failure.

6. A method of monitoring a time-varying percussive welding current applied to a pair of elements moving into percussive engagement to determine probable weld failure which comprises:

generating a standard signal of predetermined magnitude and time duration, comparing a monitoring signal, representative of said welding current, with said standard signal during said predetermined time duration, continually generating an output signal only during that portion of said predetermined time duration when said monitoring signal is below the magnitude of said standard signal, and generating a signal indicative of probable weld failure upon said output signal being generated for a predetermined period of time.

7. A method of obtaining an indication of probable weld failure from a time-varying percussive welding current applied to a percussive welding apparatus wherein an arc is struck and then extinguished, the method comprising:

monitoring said time-varying percussive welding current during a predetermined time interval commencing after arc striking and extending at least until arc extinguishment;

generating an output signal during the time within said predetermined time interval in response to said monitored current falling below a predetermined value; and generating an indication signal in response to the continuous generation of said output signal for a predetermined time period, said indication signal being representative of probable weld failure.

8. A method of detecting a characteristic of a current indicative of an unsatisfactory weld between a pair of elements moved into percussive engagement while said current is applied to said elements, which comprises:

generating in response to the application of said applied current a delayed standard signal having a predetermined magnitude;

generating in response to the application of said applied current a monitoring signal;

comparing the magnitude of said monitoring signal with said standard signal and producing an output signal during the time the magnitude of said standard signal exceeds the magnitude of said monitoring signal; and generating a characteristic signal upon said output signal exceeding a predetermined time duration.

9. A method of detecting a characteristic of a current applied to a pair of elements moving into percussive engagement, which comprises:

generating a first gating signal of a set time duration in response to said applied welding current exceeding a predetermined minimum value, generating in response to and after a predetermined time delay of the initiation of said applied welding current a standard signal having a predetermined magnitude and time duration, generating a monitoirng signal varying in accordance with magnitude of said applied welding current, mixing and comparing said standard signal and said monitoring signal to produce a start signal upon the magnitude of said monitoring signal falling below said predetermined magnitude, initiating the generation of a time variable signal in response to the production of said start signal, maintaining the generation of said time variable signal during the time that the magnitude of said monitoring falls below said predetermined value, generating a second gating signal in response to said time variable signal exceeding a predetermined time duration, and mixing said first and second gating signals to produce a signal indicative of the characteristic of said applied welding current.

10. A method of determining characteristics of a welding current applied to a pair of elements moving into percussive, welding engagement, comprising:

generating a delayed first control signal in response to the initial application of said welding current exceeding a predetermined value, generating a delayed first monitoring signal in response to the magnitude of the welding current after a predetermined period of time, producing a second control signal upon said monitoring signal having a value above or below a set range, detecting the simultaneous presence of said first and second control signals to produce a first gating signal, generating a second gating signal of a predetermined time duration in response to said welding current exceeding said predetermined value, and generating a signal indicative of the characteristics of said welding current upon concurrence of said first and second gating signals during said predetermined time duration.

11. In a system for indicating probable failure of a weld resulting from the application of a welding current to strike an arc between a pair of elements as the elements are moved into percussive engagement:

means responsive to the magnitude of said welding current for generating a monitoring signal representative of said magnitude, means responsive to application of said welding current for generating a delayed standard signal having a predetermined duration and magnitude, means operated during generation of said delayed standard signal for comparing the respective magnitude of said monitoring signal and said standard signal, and means responsive to said monitoring signal being continuously less than said standard signal for a predetermined time period during generation of said standard signal for indicating a probable weld failure.

12. In a system for indicating a probable weld failure between a pair of elements which are subjected to a welding current to strike an arc as the elements are moved into percussive engagement:

means responsive to application of said welding current for generating a delayed standard signal of predetermined magnitude and duration, means responsive to the magnitude of said welding current for generating a monitoring signal, means operated only upon said monitoring signal being of less magnitude than said standard signal during the generation of said standard signal for generating an output signal, and means responsive to continuous generation of said output signal during a predetermined time period for indicating a probable weld failure.

13. In a system for indicating a probable weld failure between a pair of elements which are subjected to a welding current to strike an arc as the elements are moved into percussive engagement:

means responsive to said welding current attaining a predetermined magnitude for generating a first gating signal of a predetermined time duration, means responsive to said welding current attaining said predetermined magnitude for generating a delayed first control signal, means rendered effective after a predetermined time delay and responsive to said welding current falling outside of a predetermined range of magnitudes for generating a second control signal, means operated by the concurrent generation of said first and second control signals for generating a second gating signal, and means responsive to the concurrent generation of said first and second gating signals for indicating a probable weld failure.

14. In a system for indicating a probable weld failure between a pair of elements which are subjected to a welding current to strike an arc as the elements are moved into percussive engagement:

means responsive to said welding current attaining a predetermined magnitude for generating a first gating signal of a predetermined time duration, means responsive to said welding current attaining said predetermined magnitude for generating a delayed first control signal, means rendered effective after a predetermined time delay and responsive to said welding current falling outside of a predetermined range of magnitudes for generating a second control signal, means operated by the concurrent generation of said first and second control signals for generating a second gating signal, means operated in delayed response to said welding current attaining said predetermined magnitude for generating a standard signal having a predetermined magnitude and duration, means responsive to the magnitude of said welding current for generating a monitoring signal, means operated by said monitoring signal being less than said standard signal during the generation of said standard signal for generating an output signal, means responsive to continuous generation of said output signal during a predetermined period of time for generating a third gating signal, and means operable during generation of said first gating signal and rendered effective by generation of at least one of said second and third gating signals for indicating a probable weld failure.

15. In a system for determining whether a time-varying percussive welding current will produce a satisfactory weld between a pair of elements subjected to said current as said elements are moved into percussive engagement:

means responsive to the magnitude of the time-varying percussive welding current for generating a monitoring signal having a time-varying magnitude representative of the magnitude of said percussive welding current, said monitoring signal having a peak magnitude value upon the striking of an arc between the moving elements;

means for generating a standard signal of predetermined magnitude and duration;

means operated only upon said monitoring signal being of less magnitude than said standard signal during said predetermined duration for generating an output signal;

means responsive to the peak magnitude of said monitoring signal falling above or below a predetermined range of magnitudes for generating a signal indicative of probable weld failure; and means responsive to continuous generation of said output signal during a predetermined time period for generating a signal indicative of probable weld failure.

16. In a system for monitoring weld current applied to a pair of articles moved into percussive engagement, wherein the weld current normally peaks, drops off and then peaks again and wherein the improvement comprises:

a normally disabled gating circuit;

means rendered effective after the first weld current peak for enabling said gating circuit;

means responsive to the weld current dropping off to a value below a predetermined value continuously for a predetermined period during a predetermined time duration for operating said enabled gating circuit; and means responsive to the operation of said gating circuit for generating a signal indicative of probable weld failure.

References Cited

UNITED STATES PATENTS

| | | | |
|---|---|---|---|
| 2,101,108 | 12/1937 | Tarbox | 219—109 |
| 2,551,856 | 5/1951 | Stadum | 219—109 |
| 2,616,014 | 10/1952 | Ellerby | 219—109 |
| 2,897,444 | 7/1959 | Garscia | 219—110 |
| 3,127,595 | 3/1964 | Coyne | 219—109 |
| 3,239,646 | 3/1966 | Goode et al. | 219—110 |

RICHARD M. WOOD, *Primary Examiner.*

P. W. MAY, *Assistant Examiner.*

U.S. Cl. X.R.

219—95